United States Patent [19]

Pratt, Jr.

[11] 3,871,017

[45] Mar. 11, 1975

[54] HIGH-FREQUENCY PHONON GENERATING APPARATUS AND METHOD

[75] Inventor: George W. Pratt, Jr., Wayland, Mass.

[73] Assignee: Massachusetts Institute of Technology, Cambridge, Mass.

[22] Filed: June 27, 1972

[21] Appl. No.: 266,757

Related U.S. Application Data

[63] Continuation-in-part of Ser. No. 54,459, July 13, 1970, Pat. No. 3,676,795, which is a continuation-in-part of Ser. No. 684,155, Nov. 20, 1967, abandoned.

[52] U.S. Cl. ............... 357/26, 330/5.5, 331/94.5 H, 331/107 A, 357/3, 357/7, 357/18, 357/30, 357/85

[51] Int. Cl. ............... H01s 4/00

[58] Field of Search..... 330/5.5; 317/234 V, 235 M; 331/107 A

[56] References Cited

UNITED STATES PATENTS

| | | | |
|---|---|---|---|
| 3,215,862 | 11/1965 | Erlbach | 317/234 V |
| 3,262,059 | 7/1966 | Gunn et al. | 330/5.5 |
| 3,312,906 | 4/1967 | Pomeranz | 330/5.5 |
| 3,405,374 | 10/1968 | Dayem et al. | 330/5.5 |
| 3,469,107 | 9/1969 | Tounes et al. | 330/5.5 |
| 3,483,487 | 12/1969 | Nanney | 317/235 |
| 3,509,489 | 4/1970 | Burns et al. | 330/5.5 |
| 3,529,164 | 9/1970 | Komatsubara et al. | 317/235 |

OTHER PUBLICATIONS

Zylbersztejn, IBM Tech. Discl. Bull., Vol. 9, No. 5, Oct. 1966, p. 499.

Spector, Appl. Phys. Lett., Vol. 7, No. 4, 15 Aug. 65, pp. 82–83.

R.A. Smith, Wave Mechanics of Crystalline Solids, 2nd Ed., (Chapman & Hall, London, 1969), sec. 8.17, pp 327–328.

Lin et al, Phys. Rev., Vol. 142, No. 2, Feb 1966, pp. 478–489, "Energy Bands of Phte. Pbse. Phs."

*Primary Examiner*—Stanley D. Miller, Jr.
*Assistant Examiner*—William D. Larkins
*Attorney, Agent, or Firm*—Arthur A. Smith, Jr.; Robert Shaw; Martin M. Santa

[57] ABSTRACT

Apparatus for generating high frequency phonons wherein a multi-valley semiconductor device is pumped and a shear stress or uniaxial stress exerted upon the device to produce different-valued energy gaps within the semiconductor material. Phonon generating apparatus of more general nature is disclosed as are, also, systems to use the phonons, thus generated.

The invention herein described was made in the course of contracts with the Office of the Secretary of Defense, Advanced Research Projects Agency.

13 Claims, 21 Drawing Figures

HIGH-FREQUENCY PHONON GENERATING APPARATUS AND METHOD

This is a continuation-in-part of application Ser. No. 54,459, filed July 13, 1970 (U.S. Pat. No. 3,676,795, granted July 11, 1972) which is a continuation-in-part of application Ser. No. 684,155, filed Nov. 20, 1967 (now abandoned).

In an application for Letters Patent entitled "Multiple Frequency Laser Apparatus and Method" Ser. No. 684,155 filed Nov. 20, 1967 in the name of the present inventor there is described apparatus and method for achieving a multiple frequency laser output based on the application of a symmetry breaking force electric, magnetic, mechanical, or a combination thereof. A consequence of the symmetry breaking force, as described in the above application, can be the emission of very high frequency phonons. These phonons may be either incoherent or coherent. Very high frequency phonons may also be emitted by forward biasing a p-n junction in a material whose energy gap is made sufficiently small, of the order of the total width of the phonon dispersion curve for the material, and, again, the phonons may be either incoherent or coherent.

Accordingly, it is an object of the present invention to provide a method of generating very high frequency phonons.

It is a further object to control both the amplitude and frequency of these phonons.

A further object is to utilize these phonons for scattering x-rays and neutrons to effect control over the intensity and direction of said scattering.

A further object is to utilize these phonons for phonon spectroscopy.

Other and further objects will be apparent in the description to follow and will be particularly delineated in the appended claims.

Broadly, and by way of summary, the invention is embraced by a method of generating phonons, that comprises: establishing an inverted electron population in a multivalley semiconductor or semimetal subjected to a symmetry-breaking stress of sufficient strength or by forwardly biasing a P-N junction whose energy gap is made sufficiently small, of the order of the total width of the phonon dispersion curve for the material of which the junction is made, either by doping or applying external pressure or by applying an external electric field or a combination thereof, so that an electron injected into the conduction band of the p-side or a hole injected into the valence band of the N-side can recombine respectively with a hole or with an electron and directly emit a phonon. The phonons thereby generated can be incoherent or coherent, and they can be employed, among other things, in spectrometry.

The invention will now be described in connection with the accompanying drawing, in which:

FIG. 1 is a schematic representation of a high-frequency phonon generator of the present invention;

FIGS. 2A, 2B, and 2C show, schematically, alternate means for pumping the generator, the circuit of FIG. 2A being particularly adapted for use with the device of FIG. 1;

Figure 16:
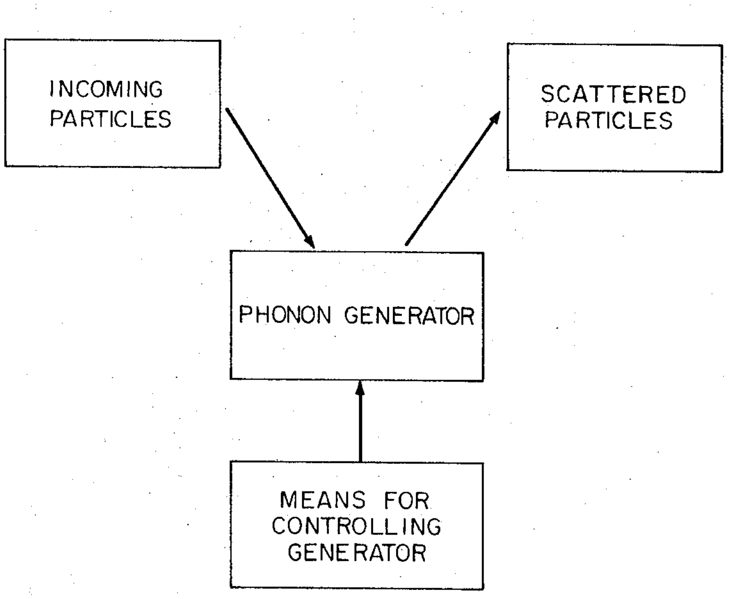
Figure 15:
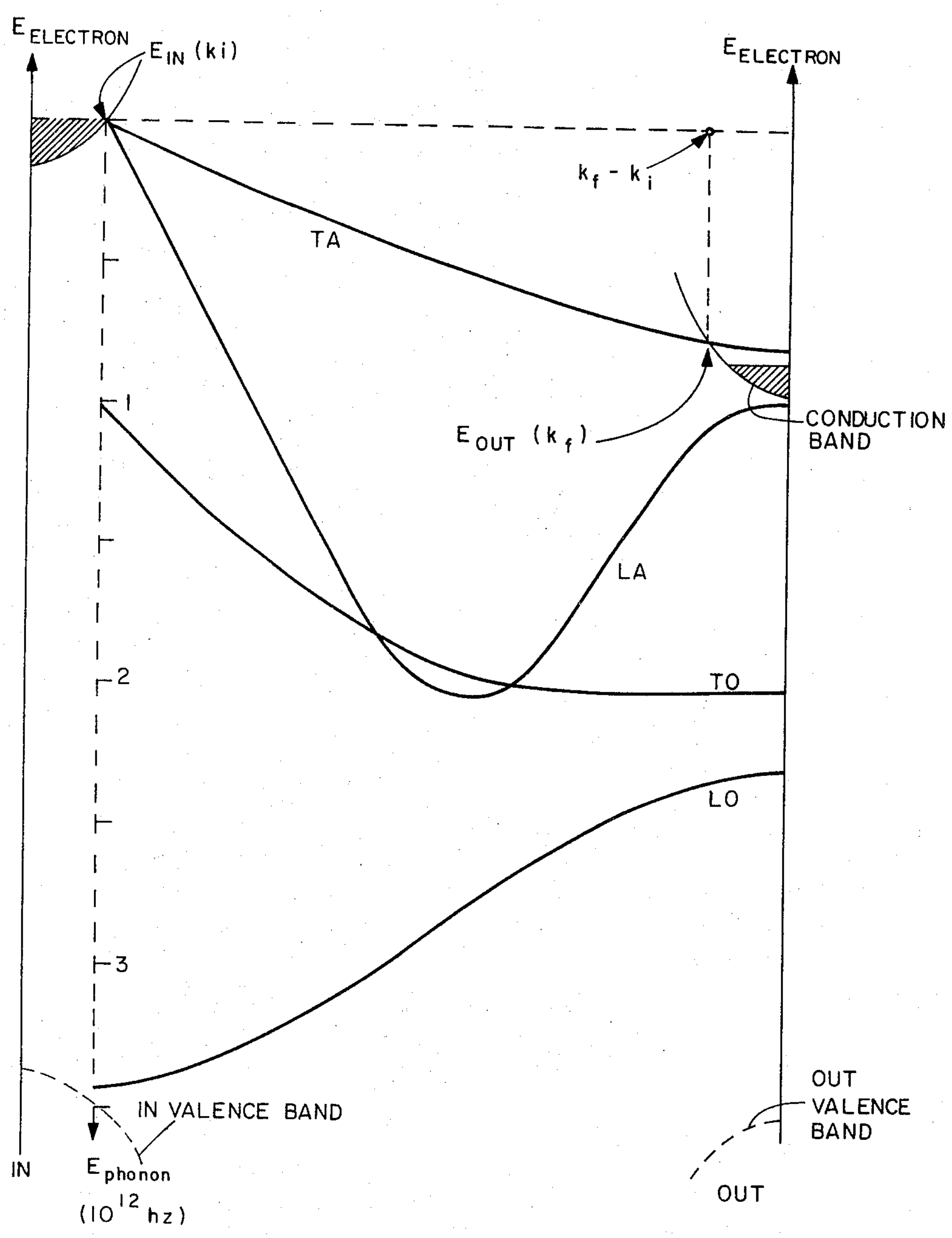

FIG. 15 is an energy vs. momentum diagram for PbSe showing a partially filled conduction-band valley in the upper left ($k_i$) which is filled by pumping as indicated by the shaded area and from which electrons make transitions to the empty-state at ($k_f$), the value of ($k_f$) being determined by the intersection of the phonon dispersion curve and the electron energy vs. $k$ curve for the right-hand shaded valley shown; and FIG. 16 shows, in block-diagram form, a scattering system.

Figure 1:
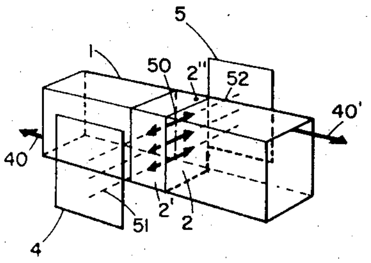

Referring now to FIG. 1 a high frequency phonon generator device is shown comprising a multi-valley semiconductor device 1 which may form at least part of an acoustic resonant cavity 2 which may further include a pair of reflectors 4 and 5 hereinafter discussed.

Figure 4:
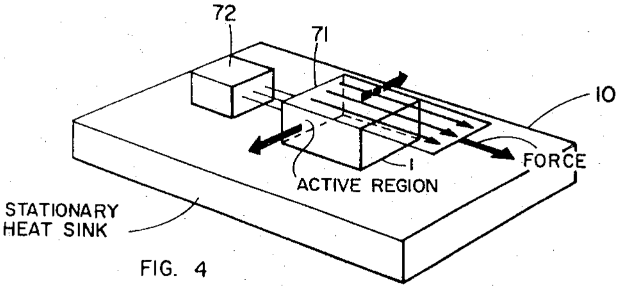
FIG. 4 is a modification of the device of FIG. 1.
Figure 6:
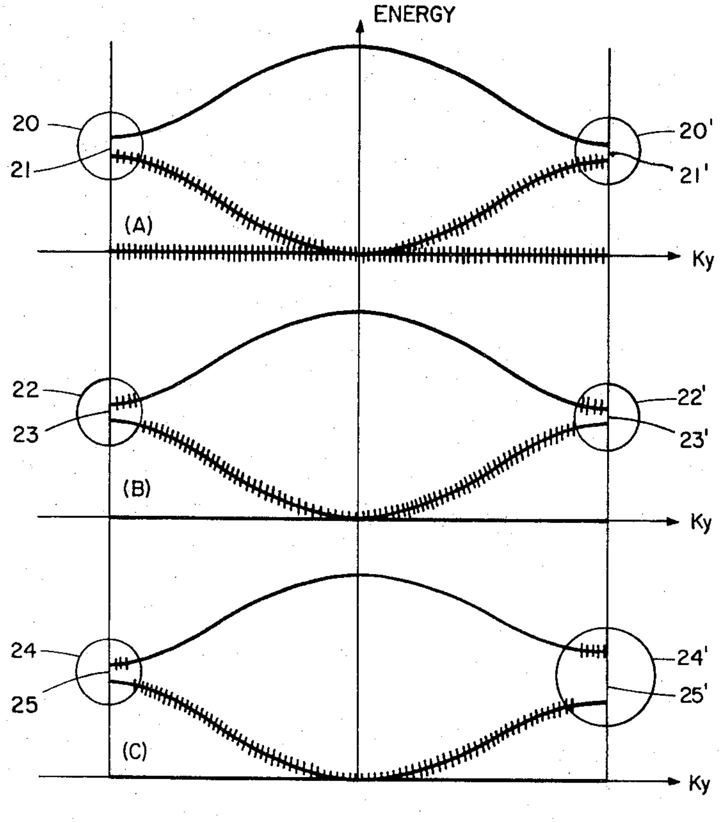
FIG. 6 is a two-dimensional diagramatic representation of three energy conditions within a laser device, as that shown, for example, in FIG. 1, the top representation (A) showing the normal, unpumped condition, the middle representation (B) showing the pumped condition, and the bottom representation (C) showing the multiple-gap energy condition of the present invention.
Figure 7:
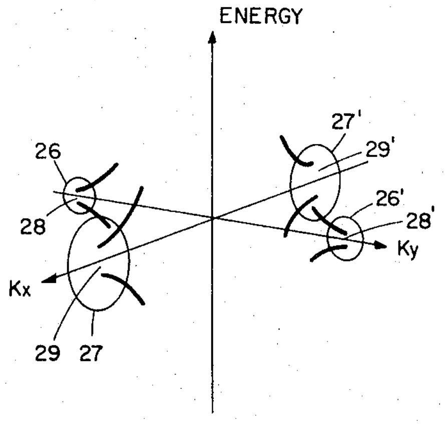
FIG. 7 is a representation similar to that shown in FIG. 6(C) except that the representation is three dimensional.

(The term "multi-valley" as used herein denotes a semiconductor whose band extrema are not at $k=0$ so that degenerate valleys result from symmetry.) The valleys refer to the circled regions shown at 20–20', 22–22', and 24–24' in FIG. 6 and 26–26', 27–27' in FIG. 7, the electron energy gaps within the circles being shown respectively at 21–21', 23–23', 25–25', 28–28', and 29–29'. An inverted population in the occupation of the electronic energy levels of the semiconductor, as represented diagramatically in FIGS. 6(B), 6(C), and FIG. 7, may be effected by the arrangement shown in FIG. 2A. The inverted electron population or negative temperature can be achieved by operating the semiconductor 1 as a diode, the active region 2 being a part of or adjacent to the junction between the P and N portions of the semiconductor, shown respectively at 7 and 8. The lattice temperature of the semiconductor 1 is reduced to and maintained at a low value by placing the device in a dewar, as that shown schematically in FIG. 12 (a dewar is shown in greater detail in U.S. Pat. No. 3,530,400), or by securing the semiconductor to a heat sink 10 in FIG. 4 and placing the complete unit in a dewar. The lattice temperature of the semiconductor must be reduced to a value low enough to enable the semiconductor material to sustain at least two separate noncommunicating or substantially noncommunicating inverted electron populations, so that the electron energy level associated with each valley, as the valley 24, is entirely or substantially entirely independent of the energy level populations of the other valleys, as the valley 24'. If the population of the electron energy levels is changed by pumping from the normal or unexcited population of the electron energy levels represented by FIG. 6A to the negative temperature or inverted population condition depicted by FIG. 6B and a symmetry-breaking strain, as by the use of the schematically represented forces 40 and 40', is applied to the semiconductor 1, the multi-valley degeneracy of FIG. 6A is lifted, resulting in the different-valued energy gaps shown at 25 and 25'. (Note also that the gaps 28 and 28' differ in value from the gaps 29 and 29'). As previously noted, however, for the condition in FIG. 6C and FIG. 7 to exist, it is necessary that the lattice temperature of the semiconductor be low enough so that little or no interaction of the populations between different valleys takes place. Conservation of energy and momentum will prevent direct contact between valley populations if the applied strain is not too large and the energy difference between the various conduction band edges or valence band edges does not exceed the energy of the proper phonon required for an electron or hole to make an energy conserving transition to another band edge, as hereinafter discussed. The energy gaps 21,21',23,23',etc., are "direct" gaps as contrasted to "indirect" gaps which occur where conduction and valence band minima and maxima respectively occur at different locations in K-space.

When the embodiment of FIG. 1 includes an acoustic resonant cavity, a pair of reflective faces 2' and 2'', in parallel planes reflect the internal acoustic energy, represented by the arrows 50, back and forth within the cavity 2 to render the cavity resonant. The faces 2' and 2'' may be assisted by the pair of external reflectors 4 and 5 in a medium 200 such as a liquid in which the device 1 is immersed and which may serve also to modify the reflected energy, shown being emitted from the cavity 2 at 51 and 52 which is subjected to shear stress directional forces 40 and 40'. In the latter event the acoustic resonant cavity will comprise the cavity 2 plus the further region between the reflectors 4 and 5. The crystal may be, for example, lead telluride (PbTe) with an excess of lead producing the N region 8 in FIG. 2A and an excess of tellurium producing the P region 7, the transition region therebetween being the active region within which lasing takes place. Other multi-valley crystals such as lead sulphide (PbS) or lead selenide (PbSe) may be used.

Figure 2A:
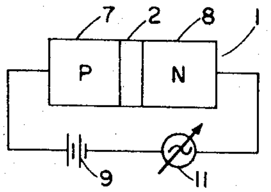
Figure 2B:
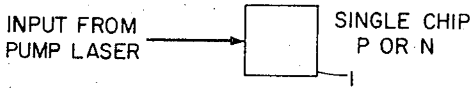
Figure 2C:
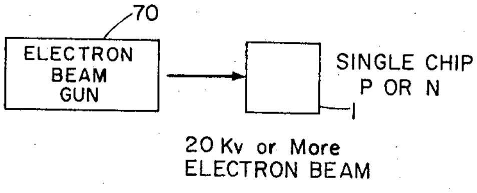

In the previous discussion, the pumping was done by the circuit arrangement shown in FIG. 2A, a battery 9 supplying the power. It is possible to pump, also, using the arrangement shown in FIGS. 2B and 4 wherein a laser (as the laser shown at 72 in FIG. 4) serves the pump function or by the use of an electron gun 70, as shown in block diagram form in FIG. 2C, which requires an electron beam of, for example, 20 Kv. Optical pumping, as particularly shown in FIG. 4, produces lasing at the exposed face of a single-P or N crystal in the form of a surface strip 71 extending orthogonal to the pump beam very near to the surface of the crystal.

If the symmetry-breaking stress is of sufficient magnitude, the energy separation of the stress split conduction and/or valence band valleys will be large enough so that carriers can transfer from a high lying valley, as 24', to a lower lying valley, as 24, by emission of a phonon and conservation of energy and momentum. Under these circumstances, the population of the valleys loses its non-communicating character and the optical emission associated with the higher lying valley ceases with the consequent generation of intervalley phonons. Thus, increasing the applied stress beyond a certain critical value can cause one or more of the optical processes to cease. Decreasing the applied stress permits the reappearance of this process. The stress rerequired for this may be applied by mechanical or piezo-electric means, as before discussed. In certain materials it is possible to use an applied stress to turn the direct optical processes totally off. This will occur when the applies stress produces an indirect gap material.

The present disclosure, as mentioned, is concerned with phonon generation rather than the generation of electromagnetic laser radiation. Therefore, the concern here is with an ultrasonic cavity with faces so oriented as to provide feedback of the phonons into the cavity. Just as in the case of a photon laser an ultrasonic cavity enhances the stimulated emission of phonons which is a necessary condition for a achieving gain or amplification of the phonons propagating in the cavity which in turn is a prerequisite for the operation of a phonon laser. Coupling to a medium external to the cavity can be effected by appropriate impedance match.

The discussion above has shown how intervalley phonons are generated by lifting the multivalley degeneracy of a semiconductor with an inverted electronic population through the application of a symmetry breaking stress which may be due to electric, magnetic, or mechanical effects. When the stress induced valley energy splitting reaches or exceeds the energy of the phonon of the correct momentum to effect an intervalley electronic transition, this electronic transition will occur with the emission of the intervalley phonon. Below this threshold value of the stress, energy and momentum conservation prevent the intervalley phonon emission. By varying the stress in the neighborhood of the threshold value it is possible to modulate the amplitude and frequency of the emitted phonons and by going above and below the threshold stress the phonons can be turned on and off. The phonons generated may be either coherent or incoherent. If they are used to scatter neutrons or *x*-rays, this modulation will in turn modulate the amplitude and direction of the scattered species. In effect these modulated phonons would form a modulated diffraction grating. Such a grating would be of particular utility with an *x*-ray laser. Variations in the frequency of the emitted phonons will be of use in phonon spectroscopy.

A series of experiments is discussed below showing how momentum conserving phonons are generated in a multivalley semi-conductor subjected to a symmetry-breaking stress. The semi-conductor also acted as a photon laser. However, this lasing action is not required for phonon generation.

Figure 9:
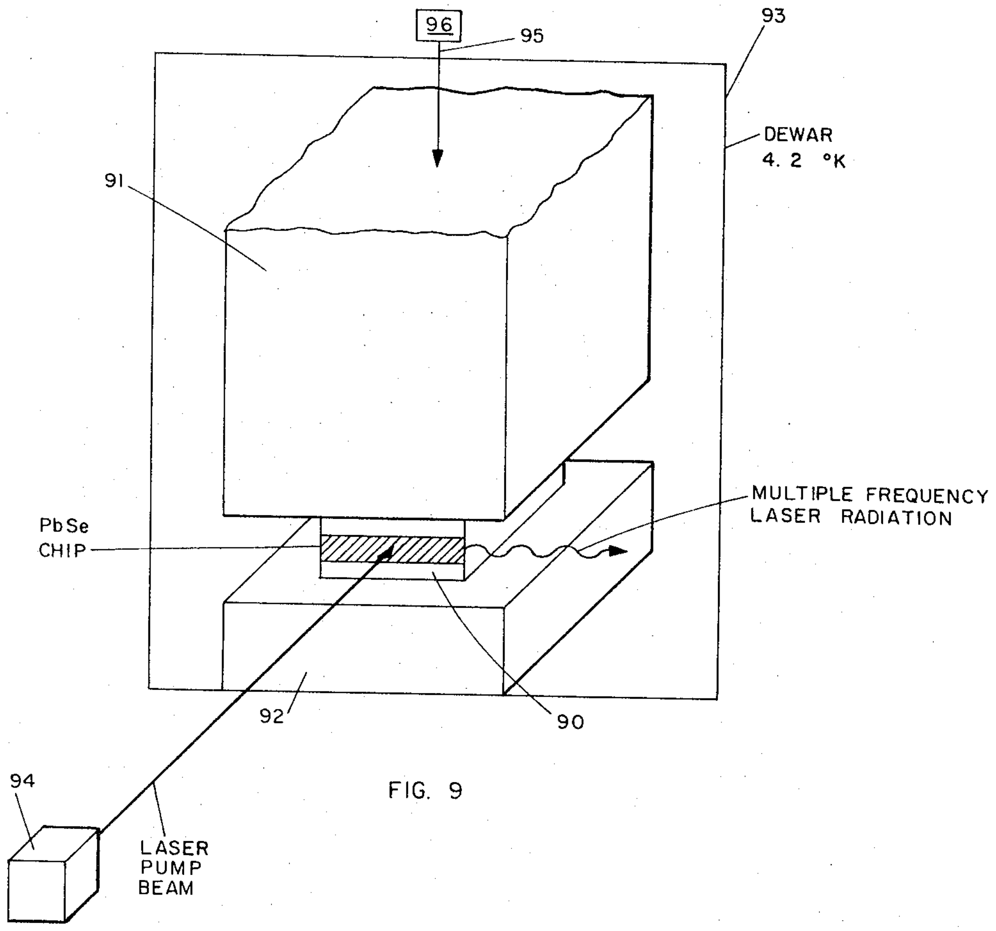
FIG. 9 is a schematic representation of a modification of the arrangmeent depicted in FIG. 1 and shows diagrammatically means for applying a compressive symmetry-breaking mechanical force to a multi-valley semiconductor.
Figures 10A, 10B:
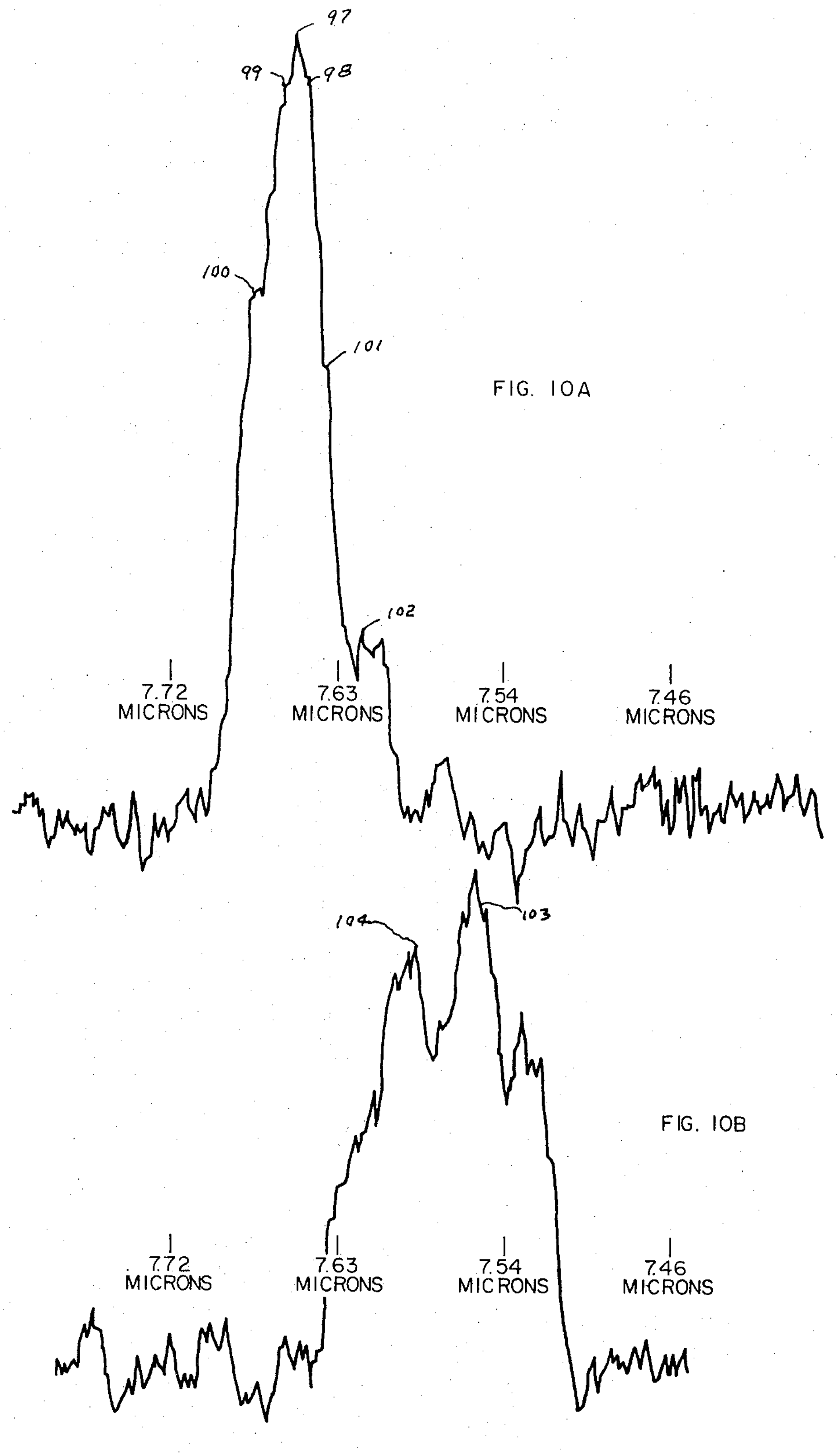
FIG. 10A is a reproduction of a recorder trace of a PbSe laser emission with no stress upon the device and showing a center of the distribution at 7.65 microns or 0.162 ev.
FIG. 10B is a trace similar to that of FIG. 10A except that there is applied to the PbSe laser a (1,1,0) symmetry-breaking stress of 68 bar and the center of the distribution is at 7.57 microns or 0.1636 ev.
Figures 10C, 10D:
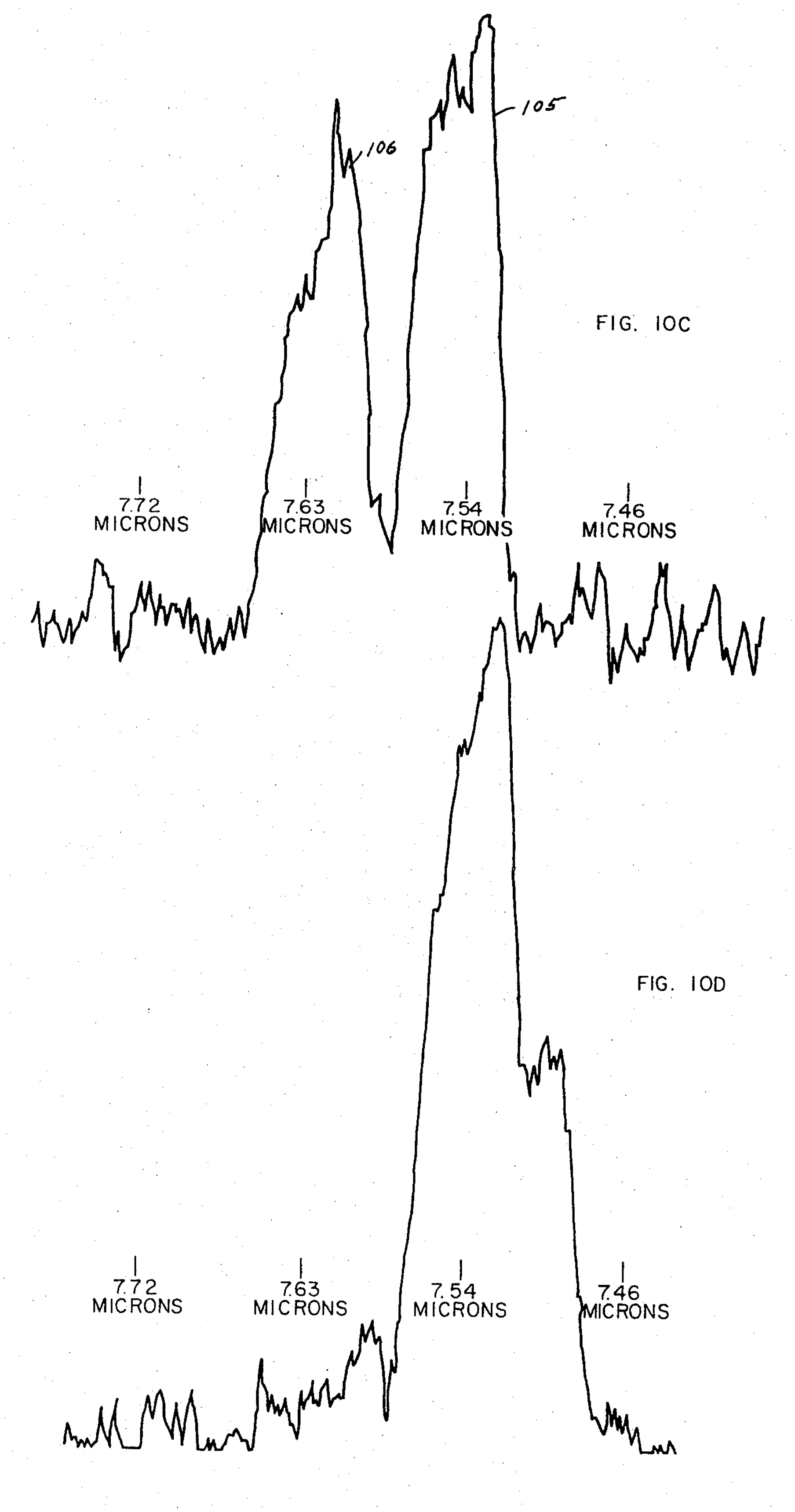
FIG. 10C is a trace similar to FIG. 10A except that there is applied to the PbSe laser a (1,1,0) symmetry-breaking stress of 99 bar and two separate frequency envelopes are shown, the lower peak of the two being at 7.61 microns or 0.1627 ev and the upper peak being at 7.55 microns or 0.1642 ev.
FIG. 10D is a trace similar to FIG. 10A except that there is applied to the PbSe laser a (1,1,0) symmetry-breaking stress of 124 bar and the center of distribution is at 7.52 microns or 0.1645 ev.

Referring now to FIG. 9, a P-type PbSe single crystal chip 90 is shown disposed within a dewar 93 (at 4.2°K in the device discussed in this paragraph) and placed between two copper blocks 91 and 92 which act as heat sinks to maintain the temperature at or near 4.2°K during lasing. Lasing is effected by a GaAs pump laser 94. In actual apparatus tested the PbSe chip dimensions of a chip such as the chip 90 and 100 microns × 150 microns × 300 microns, a mechanical compressive force represented by the arrow numbered 95 being exerted by a bellows 96 on the (1,1,0) plane of the chip, i.e. the normal to the plane in real space is in the (1,1,0) direction and this is also the direction of the 100 micron dimension. (The dimensions of the laser chip can be much larger. Further, it is necessary when using an optical pumping method to illuminate a sufficiently large portion of the chip so that lasing will occur.) The air pressure in the bellows was varied from 0 to 1,500 psi (i.e., 0 to 100 atmospheres), representing compressive forces on the chip from 0 to $1.5 \times 10^{-2}$ pounds. The laser frequency output from the chip 90 is shown in FIGS. 10A to 10D which are exact ink reproductions of test results made by a recorder of the output of the tested device. These experimental results confirm the intervalley generation of phonons. FIG. 10A represents a zero pressure or stress condition and shows a single envelope, multi-mode output similar to that discussed in Butler et al., Bulletin of the American Physical Society, vol. 10,84(1965), the single envelope being centered at 97 (about 7.65 microns) with modes at 98, 99, 100, 101 and 102, among others. In a single or univalley laser the transitions which are the source of the emitted radiation take place at a single place in *k* space. The radiation may be emitted in a single mode of the laser cavity or may be emitted in several cavity modes. In a multi-valley laser the transitions which are the source of the emitted radiation take place at the multiple points in *k* space at which the valleys are located. The radiation emitted at the multiple points in *k* space for the unstrained multi-valley laser may be in a single mode of the laser cavity or may be emitted in several cavity modes. FIG. 10A shows a condition in which all four of the equivalent (1,1,1) gaps, hereinafter discussed in connection with FIG. 13, make essentially equal contributions to the cavity modes 97 to 102. A symmetry breaking strain has the effect of altering the contributions of radiation intensity from the several valleys to a given cavity mode. Pressure is exerted by the bellows 96 and the characteristic frequencies move to the right, as shown in FIG. 10B, dividing into envelopes 103 and 104 and finally into the two separate outputs represented by the envelopes 105 and 106 in FIG. 10C. If the symmetry-breaking stress provided by force at 95 is large enough (in this particular instance about 125 atmospheres in the 1,1,0 direction), one of the envelopes disappears, as shown in FIG. 10D. In the latter situation an energy separation occurs which will allow carriers to transfer from the upper conductive band valleys at (1,1,1) and (1,$\bar{1}$,$\bar{1}$) to the lower conductive band valleys at (1,$\bar{1}$,1) and (1,1,$\bar{1}$). Both energy and momentum conservation must be satisfied in this electronic transition. This is accomplished by the emission of intervalley phonons as hereinafter discussed in greater detail. The force exerted by the bellows 96 in this example does not vary with time, but the force can vary with time to cause said one envelope to disappear and appear during the course of the pressure excursions.

In the experimental work discussed in the previous paragraph, optical cavities of annealed, $10^{18}$ P-type, PbSe were prepared with two parallel (1,1,0) pressure faces typically $6 \times 10^{-2}$mm², a pair of cleaved (1,0,0) planes which acted as reflecting faces of the laser cavity, and a pair of (1,1,0) faces one of which was used as the pumping surface. The length of the cavity between reflecting (1,0,0) planes was ordinarily 0.3 mm. Consequently, the longitudinal modes are separated by about 87 GHz. A pulsed GaAs laser was used as the pumping source 94 with 100 ns pulses at a 100 cycle repetition rate. The pumping power was about 5 watts. Before the application of pressure the PbSe sample rested freely on a copper ribbon which was carefully bonded to the cold finger of a helium exchange gas dewar. A piston, which itself was thermally anchored to the cold finger, was moved up against the copper ribbon pressing the PbSe between the ribbon and cold finger. The piston was driven by a bellows, like the bellows 96, which was connected to an outside gas supply. The pressure was measured using a bourdon guage with an accuracy of about 5 percent. The PbSe emission was focused on the entrance slit of a double pass Perkin Elmer grating monochromator whose resolution is about 50 GHz. A Au doped Ge detector was placed at the exit slit of the monochromator and the response synchronously analyzed.

FIG. 10A is a direct recorder trace of the signal with no (1,1,0) stress applied. Several modes are above threshold; however, they are not fully resolved. The peak occurs at 7.66 microns or $1.62 \times 10^{-1}$ ev. The absolute temperature is estimated to be about 30°K. FIG. 10B shows the results for an applied pressure of approximately 68 bar. The envelopes of the emission associated with the IN and OUT gaps (the terms "IN" and "OUT" are hereinafter defined) are moving apart with several modes present in each envelope shown. The center of the distribution in FIG. 10B is 7.57 microns or $1.636 \times 10^{-1}$ ev. In FIG. 10C the complete separation of the envelopes is observed at a (1,1,0) pressure of 99 bar. The lower peak is at 7.6 microns or $1.64 \times 10^{-1}$ ev. The lower energy envelope labeled 106, is due to IN valley transitions and appears here quite separate from the higher energy envelope, labeled 105, which is associated with OUT valley transitions. With further increase in pressure these two peaks move further apart. Finally, in FIG. 10D the envelope associated with the IN valley emission has disappeared completely and the OUT valley envelope roughly doubles its intensity as though it has picked up all the intensity of the missing IN valley transitions. This is due to stress induced intervalley electronic transitions which deplete the electrons excited to the IN conduction band valleys with accompanying momentum conserving phonon emission and reduce the inverted population between IN valence and conduction bands below threshold. Experimental values for the pressure dependence of the IN gap and OUT gaps of $0.88 \times 10^{-5}$ ev./bar and $2.17 \times 10^{-5}$ ev./bar were obtained in this work. Both IN and OUT gaps increase in energy at $4 \times 10^{-4}$ ev./deg. The pressure dependence of the lines is such that a pressure change or roughly 20 atmospheres is equivalent to a 1°K change in temperature. As the bellows system is pressurized, the heat leak to the sample from the outside will increase slightly increasing the sample temperature. However, the difference between the IN-OUT valley gaps according to the data obtained agrees well with the theoretical values.

In the discussion given above the multi-valley degeneracy was lifted by applying a symmetry-breaking mechanical stress. The multivalley degeneracy can also be lifted by application of an external magnetic or electric field oriented in such a way that the effect of the field is not the same for all valleys. A combination of mechanical stress, magnetic field, and electric field can also be used and the symmetry-breaking stress may be modulated in amplitude to effect amplitude and frequency modulation of the intervalley phonons.

Figure 11:
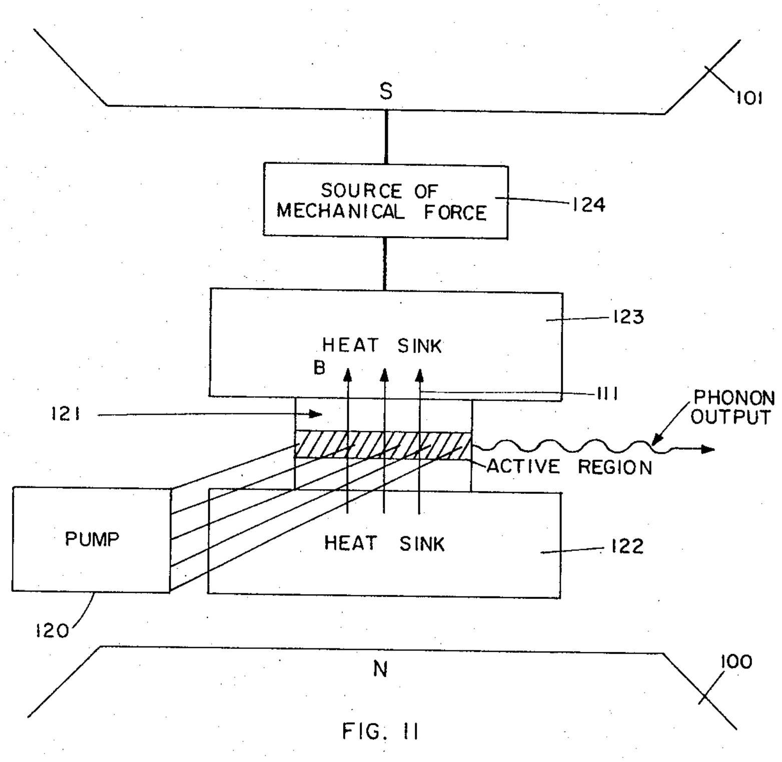
FIG. 11 is a schematic representation of a modification of the arrangement shown in FIG. 9 and shows a magnetic means for exerting symmetry-breaking stress, as well as a mechanical means.

In FIG. 11 a P-type PbSe chip 121 is again pumped by a GaAs laser 120 as shown. (The chip could be a PbSe diode with the P-N junction lying in a (1,1,0) plane.) the chip in this case is placed in a magnetic field oriented along the (1,1,0) direction. Because of the anisotropy in the g-factor of a valley and the anisotropy in the effective mass tensor of a valley, the valleys whose major axes lie IN the (1,1,0) plane are changed in energy by the applied magnetic field differently than the valleys whose major axes lie in the (1,$\bar{1}$,0) plane. The radiation emitted from states associated with the IN valleys will have a different intensity dependence on frequency than the radiation emitted from the OUT valleys. The magnetic field can be used in combination with a mechanical force and or electric field. At a sufficiently large magnetic field, depending on its orientation and the values of applied electric field and/or mechanical stress, the electrons in the highest conduction band minima will emit intervalley phonons and make transitions to the lower conduction band minima drastically reducing the intensity of radiation associated with the upper conduction band minima and enhancing the radiation associated with the lower conduction band minima. In PbSe a magnetic field of the order of $3.2 \times 10^4$ gauss would be necessary to effect this switch in the absence of simultaneous mechanical and/or electrical forces. The magnetic field required to accomplish this switch in radiation intensity can be varied by applying a mechanical stress and/or electric field. If an N-type chip is used, the holes in the lower valence band maxima will switch to the higher valence band maxima with the emission of intervalley phonons to conserve momentum when the energy difference between the lower and upper valence band maximum becomes equal to the correct momentum conserving phonon. In FIG. 11 the chip 121 is shown disposed between two heat sinks 122 and 123, the heat sink 123 being secured to a source of mechanical force 124, as before, and the whole unit being disposed in a dewar (not shown). The magnetic field is supplied by a source of magnetic field represented by the pole pieces numbered 100 and 101, but super conductor magnetics can best serve the required function. The semiconductor chip is FIG. 11 in PbSe oriented so that the heat sinks 122 and 123 press on the (1,1,0) planes of the crystal. A PbSe diode with the junction along a (1,1,0) plane is an alternate means of obtaining results similar to that obtained from the chip 121. In this latter situation one heat sink would contact the P-side of the chip and the other heat sink would contact the N-side thereof, the orientation of any magnetic field being as shown in FIG. 11.

Figure 12:
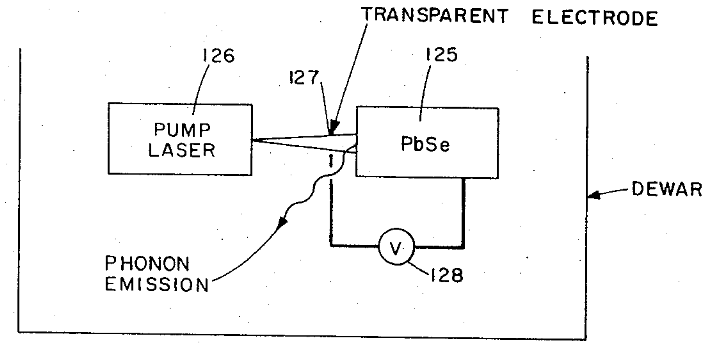
FIG. 12 is a schematic representation of a modification of the arrangement shown in FIG. 9 and shows electric means for exerting a symmetry-breaking stress.

FIG. 12 shows a P-type PbSe laser chip 125 pumped by a GaAs laser 126. The chip 125 is placed in an electric field oriented along the (1,1,0) direction. The electric field affects the band structure and optical transition probabilities of a solid. See, for example, Y. Yacoby, Phys. Rev. 140, A163 (1965) and the many references cited there. Moreover, the effect of an electric field on a particular ellipsoidal energy surface (or other constant energy surface) depends upon its orientation relative to the principal axes of the ellipsoid. Consequently, in the example given above, the IN valleys whose major axes lie in the (1,1,0) plane will be affected differently from the OUT valleys whose major axes lie in the (1,$\bar{1}$,0) plane. There will be a different intensity dependence on frequency for radiation associated with OUT valleys. At sufficiently large electric field, of the order of $10^5$ volts per cm., depending on the material and orientation of the field and on the values of simultaneously applied stress or magnetic field, the electrons in the highest conduction band minima will emit intervalley phonons and make transitions to the lower conduction band minima drastically reducing the intensity of electromagnetic radiation associated with the upper conduction band minima and enhancing the electromagnetic radiation associated with the lower conduction band minima. The electric field could be applied in any one of several standard methods such as placing a transparent electrode 127 near the pumped surface of the PbSe chip and applying a voltage from a potential source 128 between the electrode and the PbSe chip. In the case of PbSe, it is necessary to operate at 77° K or below, thus requiring a dewar, heat sink, and standard cryogenic apparatus. Also, as explained previously herein, an external electric field can effect the transfer of electrons between valleys in a semiconductor, as observed in the Gunn effect. Such a transfer could markedly alter the inverted population between valleys at any point in *k*-space and have the effect of enhancing or inhibiting the optical transitions occurring at that point in *k*-sapce.

Figure 13:
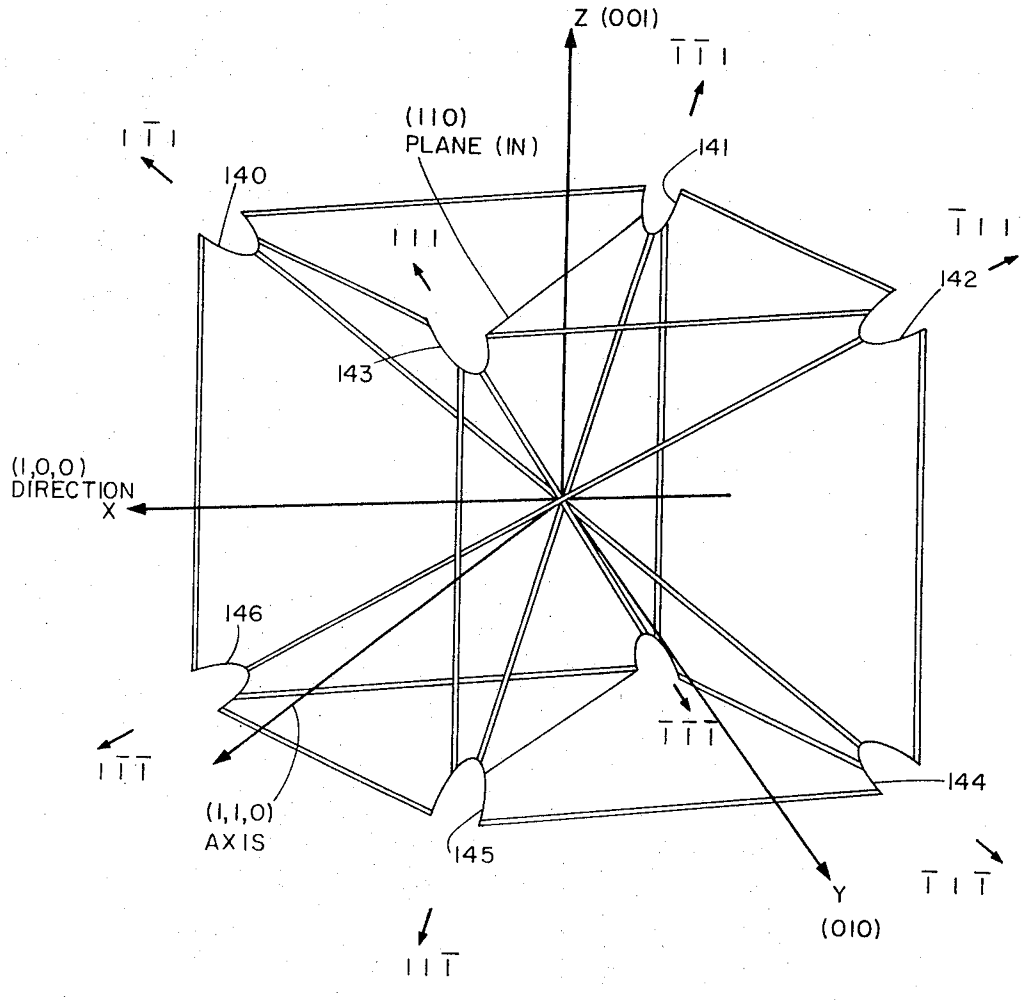
FIG. 13 illustrates in three dimensions constant energy surfaces about the valence or conduction band extrema at the L edges of the Brillouin zone.

The discussion in this and the next two paragraphs, while somewhat general in nature, relates to PbSe. PbSe is a multi-valley, direct gap, semiconductor in which the valence and conduction band valleys occur at the (1,1,1), ($\bar{1}$,1,1), (1,$\bar{1}$,1), and (1,1,$\bar{1}$) edges of the Brillouin zone. FIG. 13 shows a set of constant energy surfaces which could represent the valence band maxima or conduction band minima. Of course, there are only four independent ellipsoids since those at $\vec{k}$ and $-\vec{k}$ are related by a reciprocal lattioe vector. In FIG. 13 the four ellipsoids or valleys at $\vec{k}$ are numbered 140, 141, 142 and 143 and those a $-\vec{k}$ are marked 144, 145, 146 and 147. The ellipsoid 140, 141, 142 and 143 being respectively the (1,1,$\bar{1}$), (1,$\bar{1}$,$\bar{1}$), (1,$\bar{1}$,1) and (1,1,1) valleys and the ellipsoids 144, 145, 146 and 147 being respectively the ($\bar{1}$,$\bar{1}$,1), ($\bar{1}$,1,1), ($\bar{1}$,1,$\bar{1}$) and ($\bar{1}$,$\bar{1}$,$\bar{1}$) valleys. Further, as explained below, the valleys 141, 143, 145 and 147 are termed "IN" valleys herein and the valleys 140, 142, 144 and 146 are termed "OUT" valleys. With reference to FIG. 13, the effect of uniaxial strain, in say the (1,1,0) direction, is to break symmetry and produce different energy gaps; thus, as a result of symmetry-breaking stress, the valleys 141, 143, 145 and 147, shown to be in the (1,1,0) plane, will have one energy level and the valleys 140, 142, 144 and 146 will have another. By way of further explanation, consider P-type PbSe which is optically pumped and where the multi-valley degeneracy has been lifted. Electrons in the different conduction band minima are unable to thermalize and establish a single quasi-fermi level if the temperature is sufficiently low and the splitting of the conduction band degeneracy not too large. Intervalley transitions require the emission or absorption of a (2,0,0) phonon, as above mentioned, in order to conserve momentum. The lowest energy (2,0,0) phonon has an energy equivalent to about 50°K. Consequently, well below 50°K only phonon emission can take place. However, both energy and momentum must be conserved and phonon emission cannot occur unless the valleys differ by the energy of the emitted phonon. This corresponds to a uniaxial stress of the order of 100 bars depending, of course, on the direction of the stress. Therefore, at pressures up to this limit radiation will be emitted due to transitions originating in each conduction band valley (intervalley transition can occur due to indirect processes but they are too slow to affect stimulated emission where the optical life time of a conduction band electron is in the $10^{-11}$ to $10^{-12}$ sec. range).

When the stress splits the minima by more than the intervalley phonon energy, direct transitions can occur with phonon emission. These are very high momentum phonons which cannot die directly by a radiative process. Furthermore, it is estimated that they would have a cavity lifetime of the order of $\omega t_p = 100$ or about $10^{-10}$ sec. Since the spontaneous intervalley scattering time is estimated to be of the order of $10^{-11}$ seconds, indicating a much stronger electron-phonon coupling than the electron-photon coupling, it would appear that all of the conditions required for the stimulated emission of intervalley phonons are satisfied.

Figure 14:
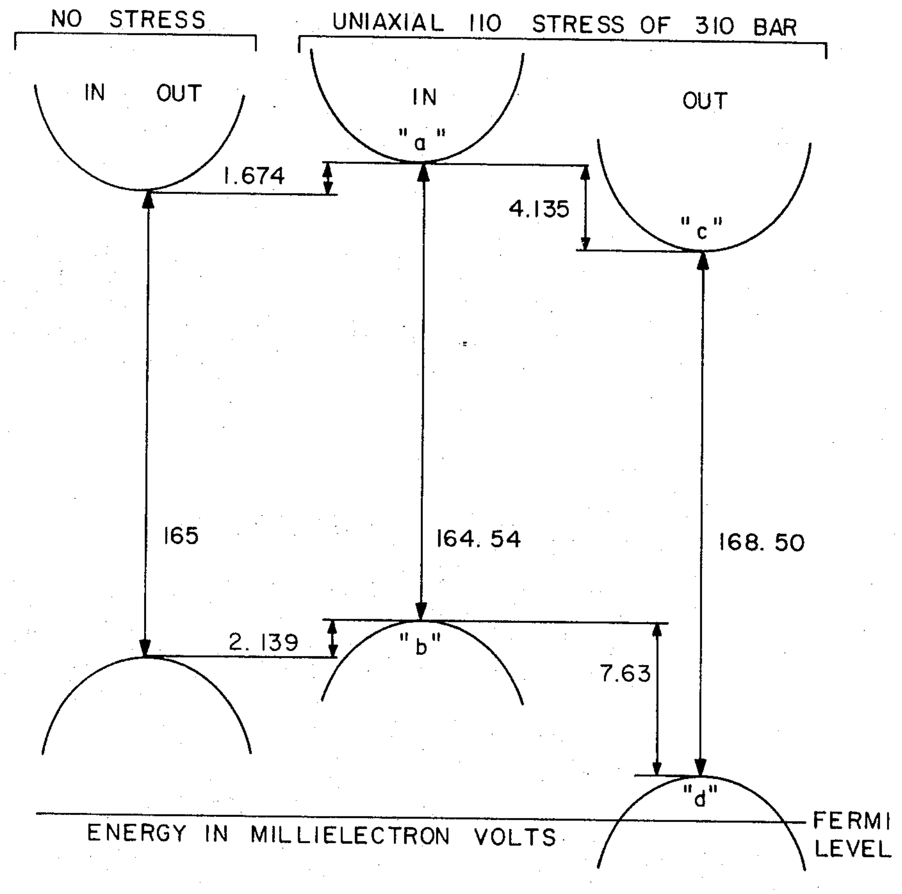
FIG. 14 shows the effect of a (1,1,0) uniaxial stress (exerted by a compression member upon a PbSe laser device in the arrangement of FIG. 9) on the valence and conduction band edges of PbSe for zero stress and a stress of 310 bars.

The chip 90 in FIG. 9 is an optically pumped P-type PbSe device subjected to a (1,1,0) stress, i.e., a stress along the (1,1,0) axis, as above discussed. As can be seen from FIG. 13, a stress oriented along the (1,1,0) axis alters the energy of the (1,1,1) and (1,$\bar{1}$,$\bar{1}$) ellipsoids differently than the (1,1,$\bar{1}$) and (1,$\bar{1}$,1) ellipsoids since the (1,1,0) stress axis lies in the (1,1,0) plane containing the major axes of the first pair of valleys, i.e., the IN valleys, but is perpendicular to the plane containing the major axes of the second pair, i.e., the OUT valleys. FIG. 14 shows the effect of a (1,1,0) stress on the IN and OUT valleys of P-type PbSe. On the left side of the figure the situation with no applied stress is shown indicating a common energy gap of 0.165 ev. or 7.5 microns for both IN and OUT valleys. On the right side of FIG. 13 the splitting of the multivalley degeneracy is shown. The IN valence and conduction bands rise and the corresponding gap decreases while the OUT valence and conduction extrema fall with the gap increasing. A uniaxial stress of 310 bars stress splits the conduction band valleys by $4.135 \times 10^{-3}$ ev or $10^{12}$ Hz, which is sufficient for an intervalley phonon to be emitted.

In a situation in which the IN-OUT conduction band valley splitting is equal to or greater than the energy of the intervalley phonon, as represented by the situation now expalined in connection with FIG. 15, an electron at the top of the distribution of an IN valley at $k_i$ can make a transition to an empty state $k_f$ in an OUT valley. The phonon spectrum is shown with increasing phonon energy directed opposite to the direction of increasing electron energy. By taking the zero of the phonon momentum at the initial electron momentum $k_i$, the nature of the intersection at $k_f$-$k_i$ of the phonon dispersion curve with the electron energy at $k_f$ for the OUT valley specifies which phonon if any can participate in an intervalley process. For phonon absorption processes the phonon energy axis is simply reversed and place the zero of momentum at $k_f$ in the OUT valley.

Figure 3:
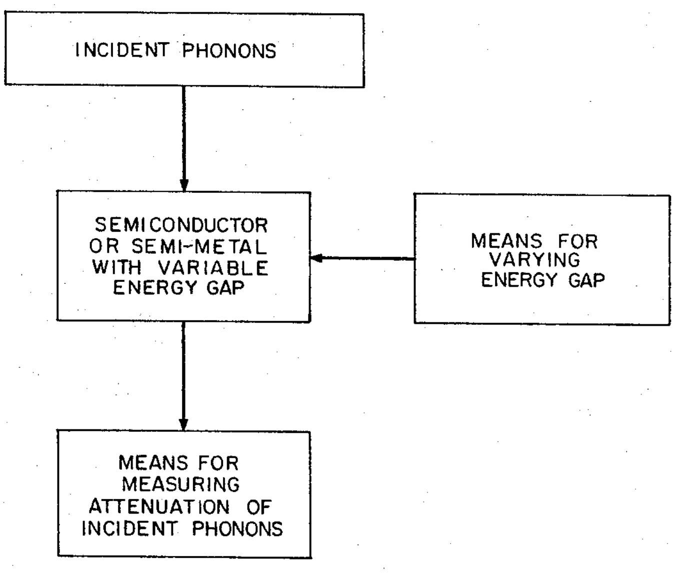
FIG. 3 shows a phonon detector in block-diagram form.

Several interesting features can be seen at once from FIG. 15. Intervalley phonon emission processes are impossible unless the IN-OUT energy splitting is at least equal to the (2,0,0) TA phonon. Intervalley phonon absorption processes are always possible, on the otherhand, unless the IN-OUT splitting exceeds the (2,0,0) LO phonon. Furthermore, if the energy gap is decreased, as for example, by alloying PbSe with SnSe, lasing would be very unlikely if the gap became equal or smaller than the width of the phonon spectrum since excited electrons in one valley could make transitions to a hole state in the valence band at the same value of k or to another valley and emit a phonon. The relatively strong electron-phonon coupling would make the loss of excited electrons by this process a rather effective bar to the establishment of a threshold inverted population for lasing. On the other hand, this is a very effective means of generating very high frequency phonons without the necessity of applying any stress, Narayanamurti et al. (Physical Review Letters, Aug. 16, 1971, Vol. 27, No. 7) have generated a narrow band of high intensity phonons in a superconductor using an analagous procedure of relaxation of high energy injected quasiparticles and made use of such phonons tuned by an applied magnetic field to observe the ground state splitting of $V^{+3}$ in $Al_2O_3$. consequently a p-n junction in a sufficiently narrow gap semiconductor forward biased will emit phonons due to minority carrier recombination. Then there is no need for a multivalley semiconductor although the best known cases of semiconductors having very narrow gaps and in fact exhibiting valence-conduction band inversion happen to be the $Pb_xSn_{1-x}Se$ and $Pb_xSn_{1-x}Te$ alloys which are multivalley. Another interesting case is gray Sn which is a semimetal whose valence and conduction band extrema are degenerate at $k$=0. (See Physics of Semi-conductors, Proc. 7th Int'l Conf. Paris, 1964, P. 41 et seq., Groves et al.) This degeneracy is lifted by a symmetry-breaking stress so that any pumping mechanism that tended to establish an inverted population would result in electron-hole recombination across a stress induced energy gap would produce phonons whose frequency would be directly dependent on the applied stress. Roman and Ewald report a gap due to uniaxial stress of 0.010 ev for a $4 \times 10^9$ dynes/cm$^2$ stress. See B. J. Roman and A. W. Ewald, Bull. Am. Phys. Soc. 13,408 (1968). Conversely gray tin could be used as a phonon detector since the attenuation of phonons passing through gray tin would markedly increase when a stress induced gap equaled the phonon energy. The source of this stress could be mechanical, magnetic, electric, or a combination thereof. In addition, any semimetal, such as Bi, Sb, As, or graphite, or semiconductor with an electronic energy gap between filled and empty levels that can be made equal to the energy of a phonon of correct momentum so that absorption of that phonon induces an electronic transition between filled and empty states, can be used as a detector of said phonons (see FIG. 3) by measuring the attenuation of said phonons. This same material will act as a source of said phonons when electrons excited into the normally unfilled levels fall back to normally filled levels. Control of the energy gap can be effected by applied electric fields, magnetic fields mechanical forces or by altering the temperature of the material. Another feature of FIG. 15 is that the intervalley transitions are unlikely to involve exactly (2,0,0) phonons since the electron states right at the band edge are occupied and not available as final scattering states.

Finally, FIG. 15 shows the possibility of having a phonon laser. Suppose that thermalization within a valley is very fast compared to intervalley processes. Then there will always be an inverted population between the initial filled state in the IN valley and the empty state in the OUT valley to which an electron scatters with the emission of a phonon. As previously discussed, the phonon cavity lifetime in this situation is of the order of $10^{-10}$ seconds, and the electron-phonon coupling, as indicated by a spontaneous intervalley scattering time of the order of $10^{-11}$ seconds, renders the situation extremely favorable for the stimulated emission of intervalley phonons.

Figure 5:
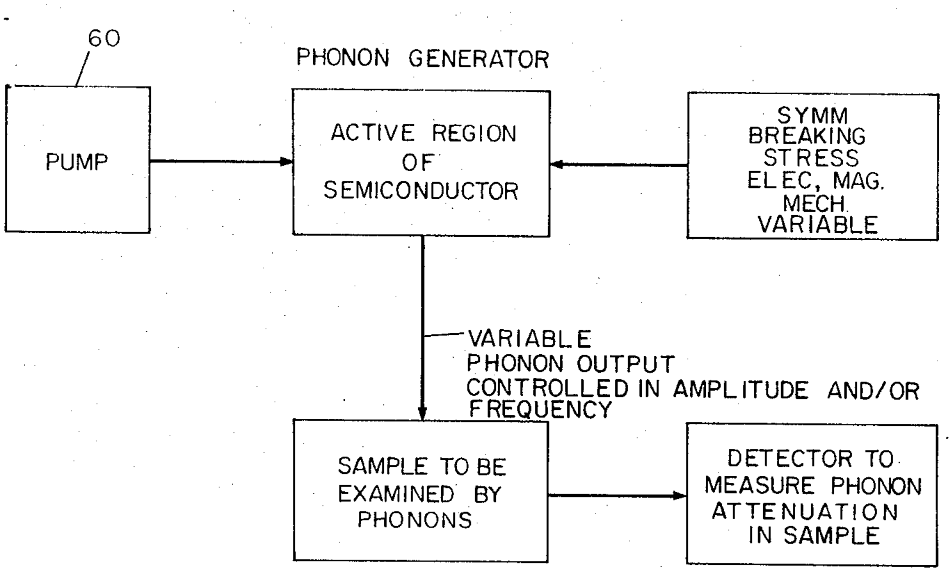
FIG. 5 is a representation, in block diagram form, of a spectrometer system embodying the present inventive concept.

Phonons generated by any of the methods described above can be used in a phonon spectrometer whereby the generated phonons cause excitation in a sample to be examined and thereby are attenuated by the sample. Measurement of the phonon attenuation or absorption relates directly to the energy level structure of the sample. A schematic representation of such a spectrometer is shown in FIG. 5.

A further case of these phonons is in scattering processes (as shown in FIG. 16) wherein an incoming particle such as a neutron or high energy photon, i.e., an $x$-ray, is incident on the phonon generator or on a medium coupled to the generator, such as a liquid or a solid bonded to the generator. The incident particle can scatter from the density fluctuations caused by the phonons which if coherent will act like a diffraction grating or the incident particle may suffer in elastic scattering from incoherent phonons. This scattering can be controlled because the frequency and amplitude of the phonons generated are variable by varying the mechanical stress or the magnetic field, or electric field, or combination of these to which the semiconductor or semimetal phonon generator is subjected. This control of the phonons implies control of the scattered beam in both amplitude and/or direction.

Figure 8:
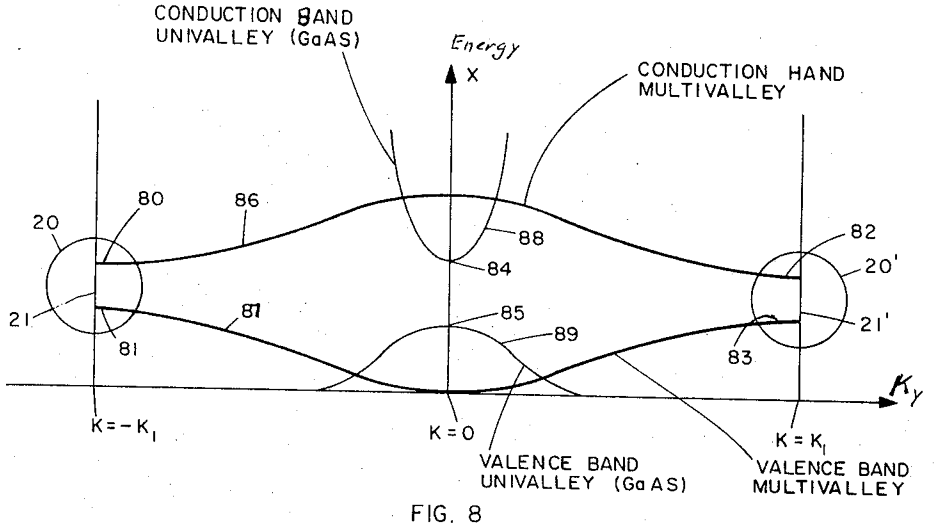
FIG. 8 is a two-dimensional diagramatic representation similar to that shown in FIG. 6A for a multi-valley semiconductor but including, also, energy-momentum curves for a uni-valley semiconductor.

This paragraph and several of the following paragraphs are devoted to defining some of the terms used in the specification with greater specificity. The term multi-valley (or many valley), used herein to describe energy band structure, is well known. A detailed explanation may be found in Chapter 2, pages 33–37 of "Semiconductors" by R. A. Smith, Cambridge University Press, Cambridge (1959). See also a book entitled "Electrons and Phonons, the Theory of Transport Phenomena in Solids," by J. M. Ziman, Oxford University Press, at page 440. The term is used in the situation wherein the maxima or minima of an energy band do not occur at $k$=0, the center of the Brillouin zone. Let the energy E at a point k in band n be denoted by $\epsilon_n(k)$. This energy must equal $\epsilon_n(k')$ where $k'$ is any point in reciprocal space reached by applying a symmetry operation R belonging to the group G of symmetry operations that leaves the crystal invariant. consequently, a conduction band minimum at a point $k$ away from $k$=0 must also occur at any point $k'$ related to $k$ by a symmetry operation which leaves the crystal invariant. Similarly, a valence band maximum at some point $k'$ away from $k$=0 must also be present at any point $k''$ related to $k'$ by a symmetry operation which leaves the crystal invariant. The curves designated 86 and 87 in FIG. 8 are the same energy-momentum curves as shown in FIG. 6A and represent respectively the conduction band and valence band of a multivalley semiconductor device (such as PbTe, PbSe or PbS) adapted to lase and in which lasing occurs due to transitions between minima 80 and 82 in the conduction band and maxima 81 and 83 in the valence band; the minima and maxima occur at the (1,1,1) edges of the Brillouin zone designated $k$=$k_1$ and $k$=$-k_1$ in FIG. 8. In order to point out quite clearly the difference between a multivalley semiconductor and single or uni-valley semiconductor, there is shown in FIG. 8, also, energy-momentum curves for a uni-valley semiconductor (as, for example, GaAs, ZnS, InSb, InAs), the curve numbered 88 representing the conduction band of such uni-valley device and the curve numbered 89 representing the valence band. The minimum point in the conduction band 88 is numbered 84 and the maximum in the valence band is numbered 85. (There are also the familiar cases of Ge and Si in which the maximum of the valence band occurs at $k$=0, which is called herein a single or univalley valence band, while the lowest points of the valence band occur away from $k$=0, respectively, at the (1,1,1) edge and along the (1,0,0) axes. The conduction bands are, therefore, multivalley. Since these are indirect gap materials, they do not act as lasers.) A stress similar to the stress discussed herein applied to a uni-valley device such as GaAs will have the effect of changing the single energy gap between 84 and 85 but not producing multiple gaps. On the other hand, it has been found for present purposes, as above explained, that a stress upon a multi-valley device can destroy the symmetry and energy degeneracy between the valleys such as the valleys 20 and 20' in FIG. 6A and FIG. 8, causing a change in the respective gaps 21 and 21' to cause one lasing frequency to be emitted from one gap and another lasing frequency to be emitted from another. To distinguish between what might appropriately be called "multi-mode" emissions of the type shown and discussed in the Butler et al. reference cited in said parent application and similar-type emissions from univalley devices such as GaAs, the term "multi-gap" (also "different-valued energy gaps") is used herein to denote the multi-frequency (or multiple frequency), multi-mode type of function within the multi-valley device wrought by a symmetry-breaking stress and "unigap" is used to describe the single envelope, multimode type of function of a uni-valley device such as GaAs or the devices discussed in Butler et al. when operated in the manner there described. Both the multi-valley and the uni-valley devices discussed herein are direct gap materials. In the present specification, it has been assumed that transitions to provide stimulated emission for lasing in both the multi-valley devices and the single valley devices is between the conduction and valence bands; but it should be here noted that transitions in the case of GaAs quite probably occur between impurity levels. However, the explanation applies in either event.

The term strain is also well known and an explanation of the term can be found in Chapter IV, "Introduction to Solid State Physics" by C. Kittel, Second Edition, John Wiley and sons, Inc., New York (1953). A coordinate system imbedded in an undisturbed solid is altered by the application of an external force. The change or strained coordinate system, $X_i'$ is related to the unstrained coordinate system $x_j$ by the components of the strain tensor $\epsilon_{ij}$ through the relation $$X_i' = (o_{ij} + \epsilon_{ij})\, x_j$$

A "symmetry-breaking strain" is a strain that leaves the crystal in such a state that the group of symmetry operations the leaves the crystal invarient, is changed. For example, a cube stretched along a direction parallel to a cube edge becomes a parallelopiped of lower symmetry than the cube, and the stress causing the strain which changes the symmetrical cube configuration to the asymmetrical parallelopiped configuration (as the stress exerted by the forces 40 and 40' in FIG. 1) is a symmetry-breaking stress causing a symmetry-breaking strain. A "shear stress" is a force applied in such a way that parallel planes in the material move in opposite directions along a line perpendicular to the normal to the planes. A mathematical explanation can be found in Kittel. The stress can be mechanical, as more particularly discussed herein in connection with FIG. 9 (See Physics by Hausman and Slack, second edition, 23rd printing, by D. Van Nostrand Company, Inc., in 1946 at pages 164–5 for discussion of mechanical stress and strain); it can be electrical as discussed in connection with FIG. 12; or it can be magnetic as discussed in connection with FIG. 11.

Two energy levels are degenerate if they have the same energy, i.e., the energy levels represented in FIG. 6B in the valleys 22 and 22' are degenerate. This condition applies in the case of multi-valley degeneracy. The "multi-valley degeneracy" is altered or lifted (as represented by FIG. 6C) if the group of symmetry operations leaving the solid invariant is altered by an applied stress, i.e., the previously existing equality of energy levels is removed. In the present invention, the equality of energy levels is removed by applying a symmetry-breaking stress which creates different-valued energy gaps (i.e., multi-gaps) as shown for example at 25 and 25' in FIG. 6C. Since the gaps 25 and 25' in FIG. 6C differ in value from one another, any radiation generated in the course of recombination at the gap 25 will differ in frequency from the frequency generated in recombination at the gap 25', and, as more particularly shown in FIGS. 10A–10D, each frequency has a number of modes.

"Occupation of energy levels" is a well known term and refers to the quantum states or energy levels which must be used to describe the behavior of the electrons.

The terms symmetry-breaking strain, shear stress, multi-valley degeneracy, and occupation of energy levels are commonly used in discussions of piezoresistance. See, for example, "Piezoresistance Effect in p-Type PbTe" by J. R. Burke, Jr., Physical Review. Vol. 160, pages 636–648 (1967), the Zinman reference above mentioned, and R. W. Keyes, IBM Journal, Volume 5, pages 266–278 (1961).

The term "non-communicating character" used herein refers to the selection rules governing transitions between different valleys. If, overall, momentum and energy cannot be conserved in such a transition, the transition is forbidden and there is no "communication" between the different valleys, i.e., the valleys are non-communicating. A many-valley semiconductor is explained at page 440 of the Ziman reference, as before mentioned. Examples are PbTe, PbSe, PbS, as was previously discussed. Different-valued energy gaps can be all simultaneously pumped by the same device or each can be pumped separately with individual controls; thus, pumping can be effected by the means illustrated in FIGS. 2A, 2B and 2C alone or in some combination.

Modifications of the invention herein disclosed will occur to those skilled in the art and all such modifications are deemed to be within the spirit and scope of the invention as defined in the appended claims.

What is claimed is:

1. A method of generating phonons, that comprises, providing a body of semiconductor having a multi-valley energy level band structure, that is, a semiconductor whose electron energy level band extrema are not at $\vec{k} = 0$, where $k$ is vector pseudomomentum, so that degenerate valleys result from symmetry, said semiconductor having a conduction band of electron energy levels and a valence band of electron energy levels, said conduction band including unfilled levels and said valence band including filled levels in a condition of thermal equilibrium, said method further comprising the step of establishing a nonequilibrium population in the occupation of the electron energy levels in said valence and conduction bands by supplying energy to move electrons from filled levels in said valence band to unfilled levels in said conduction band, the lattice temperature of the semiconductor being maintained at a value low enough to enable the semiconductor to sustain at least two separate inverted electron populations in energy level band valleys having different values of vector pseudomomentum $\vec{k}$, said method further comprising the step of applying a stress to the semiconductor, the stress being one that lifts the multi-valley degeneracy and being of sufficient strength that intervalley electronic transitions combined with the generation of corresponding momentum conserving phonons take place.

2. A method as claimed in claim 1 and in which the stress is varied in at least one of direction, magnitude and time to alter the extent to which the multi-valley degeneracy is lifted, thereby to change the amplitude and, frequency of the phonons associated with the intervalley transitions.

3. A method as claimed in claim 1 and in which the stress is a symmetry-breaking stress.

4. A method as claimed in claim 1 and in which the population inversion is achieved by operating the semiconductor as a diode.

5. A method as claimed in claim 1 and in which the electron population inversion is effected by optical pumping.

6. A method as claimed in claim 1 and in which the electron population inversion is effected by passing an electron beam through the semiconductor, energy being extracted from the beam to create negative electron temperature within the semi-conductor.

7. A method as claimed in claim 1 and in which the stress applied is a shear stress.

8. Apparatus for generating phonons, that comprises, a multi-valley semiconductor, that is, a semiconductor whose band extrema are not at $\vec{k}=0$, where $\vec{k}$ is vector pseudomomentum, so that degenerate valleys result from symmetry, said semiconductor having a conduction band of electron energy levels and a valence band of electron energy levels, said conduction band including unfilled levels and said valence band including filled levels in a condition of thermal equilibrium, means for establishing an inverted population in the occupation of the electronic energy levels of the valence and conduction bands of the semiconductor by supplying energy to move electrons from filled levels in said valence band to unfilled levels in said conduction band, means for maintaining the lattice temperature of the semiconductor at a value low enough to enable the semiconductor material to sustain at least two separate inverted electron populations in energy level band valleys having different values of vector psuedomomentum $\vec{k}$, and means for applying a stress to the semiconductor, the stress being one that lifts the multi-valley degeneracy and of sufficient strength that intervalley electronic transitions combined with the generation of corresponding momentum conserving phonons take place.

9. Apparatus as claimed in claim 8 and in which an acoustic resonant cavity is established wholely within the semiconductor and has reflective faces that are parallel and planar to provide reflection surfaces to enable establishment of stimulated emission of phonons.

10. Apparatus as claimed in claim 8 and in which the semiconductor is selected from the semiconductor group consisting of lead telluride, lead sulphide and lead selenide.

11. Apparatus as claimed in claim 9 and in which external reflectors form at least part of the acoustic resonant cavity.

12. Apparatus as claimed in claim 8 and in which means is provided for varying the applied stress in at least one of direction, magnitude, and time thereby to change the amplitude or frequency or combination of amplitude and frequency of the emitted phonons.

13. Apparatus for generating phonons, that comprises, a multi-valley semiconductor, that is, a semiconductor whose band extrema are not at $\vec{k}=0$, where $\vec{k}$ is vector pseudomomentum, so that degenerate valleys result from symmetry, said semiconductor having a conduction band of electron energy levels and a valence band of electron energy levels, said conduction band including unfilled levels and said valence band including filled levels in a condition of thermal equilibrium, the semiconductor being adapted to receive energy to establish an inverted population in the occupation of the electronic energy levels of the valence and conduction bands therein by supplying energy to move electrons from filled levels in said valence band to unfilled levels in said conduction band, and means for applying a symmetry-breaking stress to the semiconductor, the stress being one that lifts the multi-valley degeneracy and produces different-valued energy gaps within the semiconductor material and of sufficient strength that intervalley electronic transitions combined with the generation of corresponding momentum conserving phonons take place.

* * * * *